UNITED STATES PATENT OFFICE.

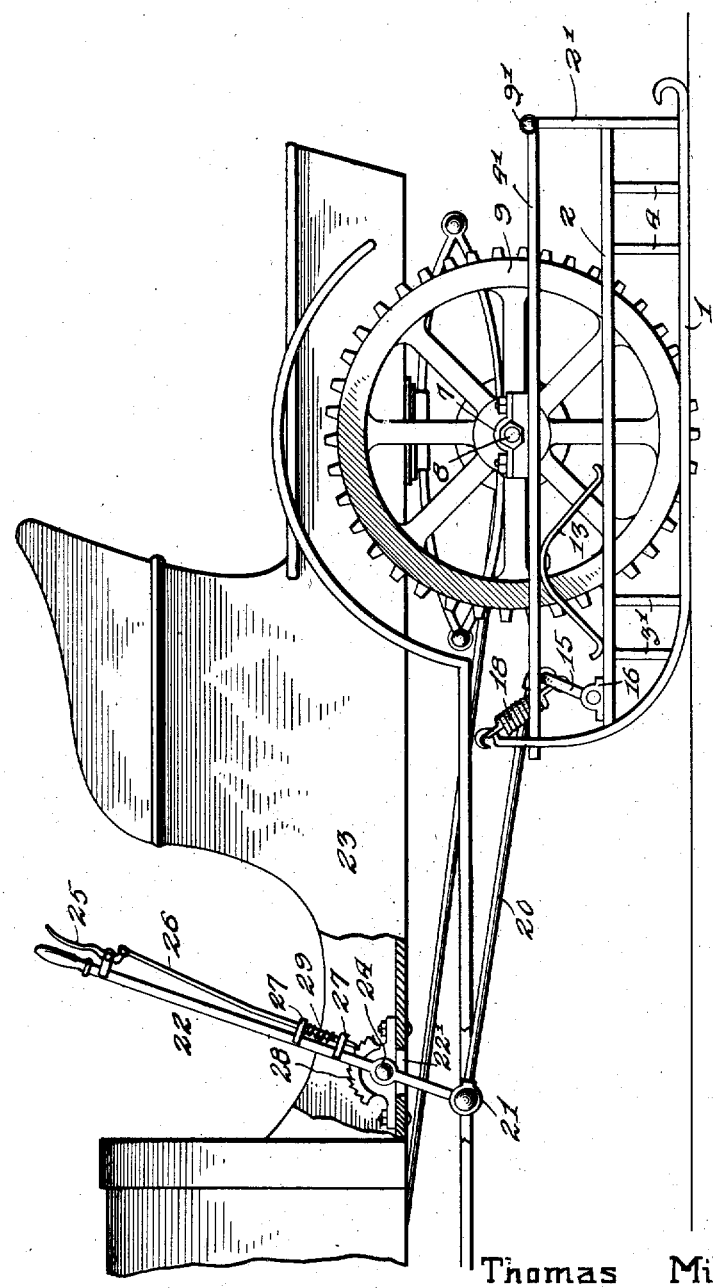

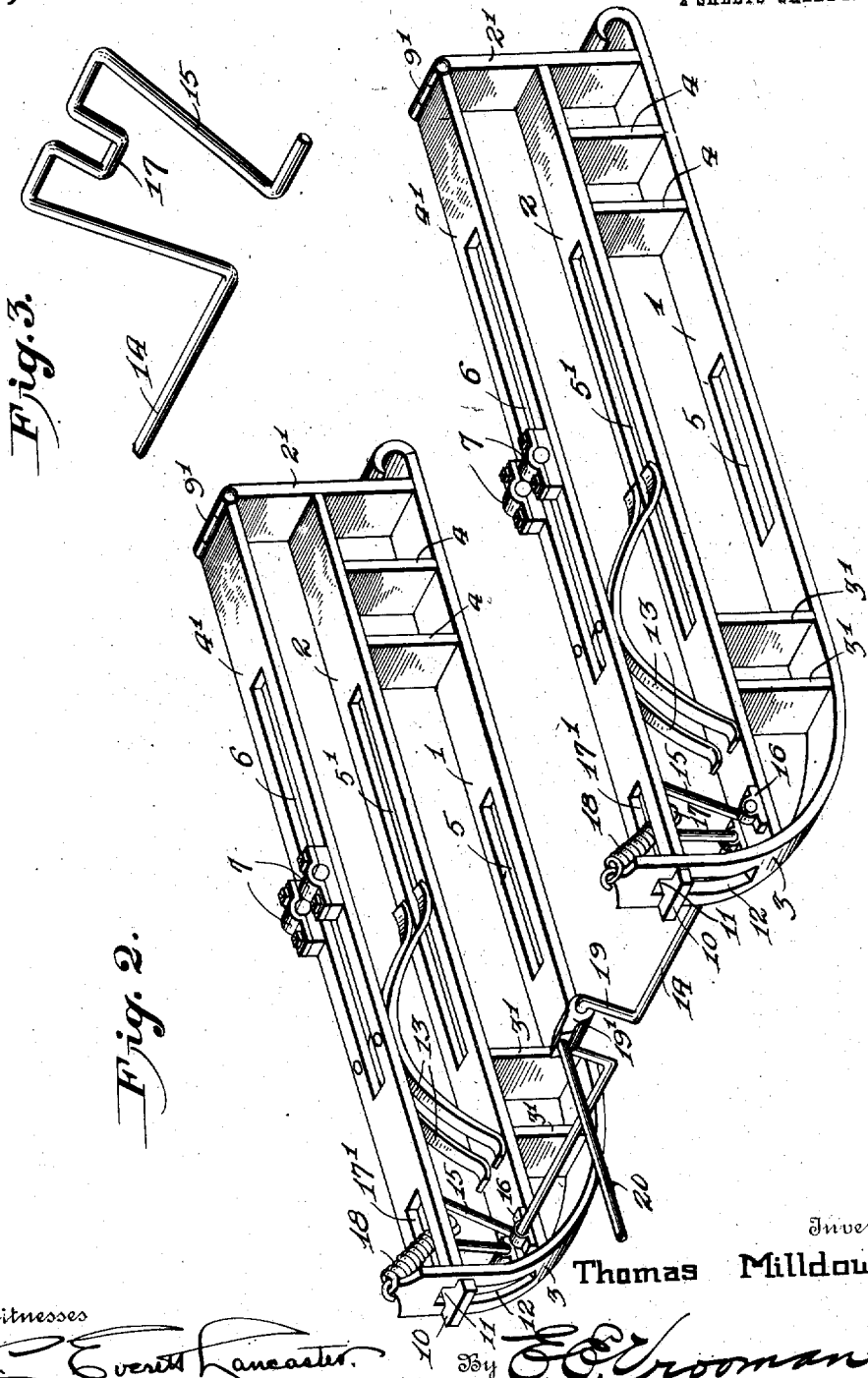

THOMAS MILLDOWN, OF RED LODGE, MONTANA.

RUNNER FOR AUTOMOBILES.

975,267.  Specification of Letters Patent.  Patented Nov. 8, 1910.

Application filed April 20, 1910. Serial No. 556,609.

*To all whom it may concern:*

Be it known that I, THOMAS MILLDOWN, a citizen of the United States of America, residing at Red Lodge, in the county of Carbon and State of Montana, have invented certain new and useful Improvements in Runners for Automobiles, of which the following is a specification, reference being had therein to the accompanying drawing.

This invention relates to devices to be attached to an automobile by means of which it may be propelled over snow or ice.

The invention has for its object to provide an improved apparatus for this purpose by means of which an automobile may be utilized to travel over either snow or ice.

The invention has further for its object to provide an apparatus which may be attached to an automobile and used in lieu of the wheels thereof to convert an automobile into a sleigh and by means of which the automobile may be used to travel over either snow or ice.

With these and other objects in view, the invention is more fully set forth in the accompanying drawings and specification.

Referring to the drawings: Figure 1 is a side view of an automobile showing it equipped with an apparatus constructed according to this invention. Fig. 2 is an enlarged perspective view of the apparatus constructed according to this invention, which is adapted to be attached to the axles of an automobile in place of its wheels. Fig. 3 is an enlarged detailed view of a portion of the mechanism employed in connection with the apparatus shown in Fig. 2.

In carrying out this invention a pair of runners are employed which are constructed with a bottom runner 1, an intermediate strip 2 located at some little distance above the bottom runner 1 and secured at one end to an upright or standard 2' at the rear end of the runner 1 and to a curved upright portion 3 of the forward end of the runner 1. The strip 2 is supported by means of uprights 3'—3' and 4—4. Spaced at some little distance above the strip 2 is an upper strip 4' connected at its rear end to the top of the standard 2' and at its forward end to the upper end of the curved portion 3 of the runner 1. The strips 1, 2 and 4' are each provided respectively with a slot 5, a slot 5', and a slot 6; the slot 6, the slot 5' and the slot 5 being each smaller than the other to accommodate a tooth wheel hereinafter referred to.

Upon the top strip 4' of each runner is mounted a pair of axle bearings 7, which pair of axle bearings 7 is adapted to receive an axle 8 of an automobile, said axle 8 projecting through the hub of a tooth wheel 9, as shown in Fig. 1, the wheel 9 projecting through the slot 6 and the slot 5', and a portion of the rim of said wheel 9 projecting into the slot 5. The rear end of the strip 4' is hinged at 9' to the top of the standard or upright 2' and the forward end of the strip 4' is provided with a headed end 10, the neck 11 of which is located in a vertical grooved slot 12 in the upper end of the curved portion 3 of the runner 1.

By means of this construction, it will be seen that the wheel 9 is mounted upon a yieldable support so as to permit of a vertical play of the wheel 9. Each strip 4' of the runners is yieldably supported by means of curved springs 13 secured to the under side of the strip 4' and having their ends bearing on the top of the strip 2. At the forward end of the runners is mounted a crank shaft 14 formed at its ends with upwardly-projecting U-shaped portions 15, each of said U-shaped portions 15 being hinged on bearings 16 of the strip 2, said U-shaped portions 15 having an intermediate U-shaped portion 17 located beneath a slot 17' in the forward end of each of the strips 4' through which slot 17' extends a coil spring 18 connected at one end with the U-shaped portion 17 of the crank member 15, the other end of the spring 18 being suitably secured to the upper end of the curved portion 3 of the runner 1. A crank shaft 14 is formed at its central portion with a crank member 19 having a hinged sleeve member 19' from which extends a rod 20 hinged at its forward end, as at 21, to the lower end of an operating lever 22 projecting through a slot 22' in the floor of an automobile 23 and hinged to a bracket 24 in the bottom of the automobile, said projecting lever arm 22 having a handle 25 hinged thereto and hinged to a rod 26 passing through a bracket 27 of the lever 22 and having its lower end adapted to be moved into and out of engagement with a curved rack 28 on the bracket 24 whereby the lever arm 22 may be held in locked engagement. The rod 26 is held in engagement with the rack 28 by means of a coil spring 29 located on the rod 26 between the brackets 27.

By means of this construction, the lever arm 22 may be operated by the occupant of the automobile to operate the crank shaft 14 and raise and lower the crank members 15 thereof, the upper end of each of the crank members 15 bearing against the under side of each strip 4', whereby when the parts are in the position shown in Figs. 1 and 2 each strip 4' will be held up by the crank members 15, held in locked engagement through the locking lever 22 and the toothed wheel 9 on each side of the automobile will have its teeth thereby in engagement with the surface over which the runners travel. In this position the automobile may be used as a sleigh to run on snow or ice by means of the runners, the toothed wheels being in engagement with the surface over which the runners travel. When it is desired to use the automobile on ice, the toothed wheels 9 are moved into operative position to engage the ice by operating the lever handle 22 so as to move the crank arms 15 down out of engagement with the upper strip 4' of each runner thereby permitting the upper strip 4' of each runner to swing downward through the weight of the automobile and to cause the edge of each tooth wheel 9 to project through each slot 5 and the teeth of said wheel to project below the bottom of each runner, as is shown in Fig. 1. In this position, the runners are slightly raised above the surface of the ice. When the arms 15 are in a lowered position the coil spring 18 connected with each crank arm 15 is under tension as also the curved spring 13 between the strips 4' and 2. When the toothed wheels are to be moved out of engagement with the surface over which the automobile is to travel by operating the crank shaft 14, the crank arms 15 are each raised up by each strip 4' and with it the toothed wheel mounted thereon. The springs 18 and 13 aid in moving the strip 4' to its position as shown in Figs. 1 and 2.

By means of an apparatus constructed in accordance with this invention the runners may be readily affixed to the axle of the rear wheels of an automobile and the runners and the toothed wheels can be used interchangeably by means of the operating crank mechanism described so as to utilize an automobile for use either on ice or snow.

What I claim as my invention is:—

1. In an apparatus of the character described, a pair of runners mounted on the axle of an automobile, a toothed wheel mounted on each end of said axle and extending vertically through each of said runners and having a yielding support thereon, a crank shaft mechanism operatively connected with said yielding support, and means for locking said crank shaft mechanism.

2. In an apparatus of the character described, a pair of runners each adapted to be mounted on the axle of an automobile, each runner consisting of a bottom strip and parallel, spaced strips above said bottom strip, each of said strips having a longitudinal slot, a toothed wheel mounted on each end of the axle of an automobile said axle having its bearing in the upper top strip, and said toothed wheel extending through the slots in said strips, the upper strip being hinged at one end, a crank shaft mechanism having crank shaft members located beneath the forward end of said top strip, springs connecting said crank members with the runners, springs supporting said top strip, and means for operating said crank shaft mechanism.

3. In an apparatus of the character described, a pair of runners, each formed with a bottom runner having an upwardly-curved forward end, a longitudinal strip spaced above said bottom runner and connected thereto, a top strip spaced above said longitudinal strip and hinged at its rear end to the runner and having its forward end vertically movable and connected with the bottom runner, springs interposed between the top strip and the intermediate longitudinal strip, each of said strips having a longitudinal slot, bearings on the top strip of each runner for the axle of an automobile, a crank shaft mechanism mounted on the forward end of the runners and having a crank member at each end bearing against the under side of the top strip, and a spring connecting each of said crank members with the forward end of the lowest bottom strip of the runner.

In testimony whereof I hereunto affix my signature in presence of two witnesses.

THOMAS MILLDOWN.

Witnesses:
L. O. CASWELL,
THOMAS HAMILL.